United States Patent [19]

Kirkgasser et al.

[11] 4,179,964
[45] Dec. 25, 1979

[54] RIBBON CABLE SPLITTING DEVICE

[75] Inventors: James P. Kirkgasser, DeWitt; Arthur C. Goldsmith, Lafayette, both of N.Y.

[73] Assignee: K-G Devices Corporation, DeWitt, N.Y.

[21] Appl. No.: 774,891

[22] Filed: Mar. 7, 1977

Related U.S. Application Data

[63] Continuation-in-part of Ser. No. 652,862, Jan. 27, 1976, abandoned.

[51] Int. Cl.² .................... B26D 5/10; H02G 1/12
[52] U.S. Cl. ........................ 83/599; 30/197; 81/9.51; 83/925 R
[58] Field of Search ............ 30/90.4, 90.8, 91.1, 30/91.2, 196, 197, 226, 304, 305, 189; 29/749, 566.1, 566.4, 750; 81/9.51, 9.5 C, 9.5 R, 9.5 B

[56] References Cited

U.S. PATENT DOCUMENTS

| | | | |
|---|---|---|---|
| 244,789 | 7/1881 | Breth | 30/189 |
| 2,347,956 | 5/1944 | Lansing | 30/91.1 X |
| 2,392,459 | 1/1946 | Casalino | 83/620 |
| 2,430,383 | 11/1947 | Yager | 30/189 |
| 2,594,363 | 4/1952 | Stephenson | 30/91.1 |
| 3,553,999 | 1/1971 | Rommel | 29/752 X |
| 3,575,329 | 4/1971 | Hannabery | 83/925 R |
| 3,846,894 | 11/1974 | Parsons | 30/91.1 |
| 3,851,371 | 12/1974 | Plunkett | 29/816 |
| 3,916,733 | 11/1975 | Meadows | 81/9.51 |
| 3,988,815 | 11/1976 | Petree | 81/9.51 X |
| 4,046,045 | 9/1977 | Stevens | 81/9.51 X |

FOREIGN PATENT DOCUMENTS

| | | | |
|---|---|---|---|
| 17117 | 1/1955 | Fed. Rep. of Germany | 30/91.2 |
| 525691 | 9/1940 | United Kingdom | 30/91.2 |

Primary Examiner—Nicholas P. Godici
Attorney, Agent, or Firm—James Magee, Jr.

[57] ABSTRACT

A ribbon cable splitting device is described in which an opposing pair of splitting elements having a number of equally spaced specially shaped teeth are brought together in an interlaced fashion to separate the individual conductors of a similarly spaced ribbon cable. The shape, spacing and quantity of teeth on each of the splitting elements and the basic device may be varied to accommodate various sizes of ribbon cable for splitting or subsequent connection to cable connectors, circuit boards or terminals. This invention is directed to a device for separating insulated ends of parallel multiwire electrical cables of the so-called ribbon type. More particularly the invention is that of an apparatus capable of separating each individual insulation covered electrical wire from those adjacent by means of separating and spacing elements having cutting elements shaped to engage the wires, cut the material joining them together and space the cut sections.

2 Claims, 6 Drawing Figures

RIBBON CABLE SPLITTING DEVICE

CROSS REFERENCE TO RELATED APPLICATIONS

This application is a continuation-in-part of our application Ser. No. 652,862 filed Jan. 27, 1976 now abandoned.

BACKGROUND OF THE INVENTION

Electrical wires and conductors of the ribbon type generally comprise a plurality of parallel conductor units each carried within a covering or sheath of insulating material. The individual wires already coated with an insulating material can be laid side by side and formed into a ribbon-like assembly, e.g. by cementing or heat sealing, to form a flat multiwire ribbon. Alternatively, adjacent wires can be directly coated by extruding the insulation directly onto the wires. In all cases the final result is a flat assembly comprising parallel wires or conductor units coated with and joined together by an insulating material.

There are in existence methods for the removal of insulation from the electrically conductive wires prior to attachment to terminals and circuit boards. Removal of insulation is usually accomplished prior to separation of the conductor units although it can be accomplished after the wires have been separated. Known mechanical means are usually employed to remove the insulation from the wire. However, the separation of the parallel wires into discrete single conductor elements has been left largely to manual methods employing a knife or similar cutting tool which is used to cut the web between each conductor unit. Once separated and spaced, the individual conductor units can be easily manipulated for attachment to or isolation from electrical or electronic connection points.

It is an object of this invention to provide an efficient and convenient means for separating conductor units from a unitary multiconductor assembly without damage to the conductive material.

Another object of the invention is to provide means for separating the conductor units either at the ends thereof or at any point along the length thereof.

A still further object of the invention is to provide means for spacing the separated portions of the insulation clad conductors.

Another object of the invention is to provide simple and convenient apparatus for simultaneously separating and spacing conductor units in a multi-wire assembly.

These and other related objects are achieved by an apparatus which comprises a pair of opposing ribbon cable separating and spacing elements which when actuated operate to separate adjacent conductor units and space them apart without removal of electrically insulating covering. After completion of the separating and spacing operation the elements are mechanically returned to their original position ready for reuse.

The separating and spacing elements of the device of this invention generally comprises a pair of engageable jaws, each having a plurality of meshing teeth spaced to engage the individual conductor units, cut the web therebetween, and deform the conductor units to separate and space them. It should be noted that the separation and spacing operation does not involve removal of insulation or exposure of conductive wire.

DESCRIPTION OF THE DRAWINGS

The invention and particular embodiments thereof will be more fully visualized and understood after consideration of the accompanying drawings in which.

DETAILED DESCRIPTION OF THE DRAWINGS

Figure 1:
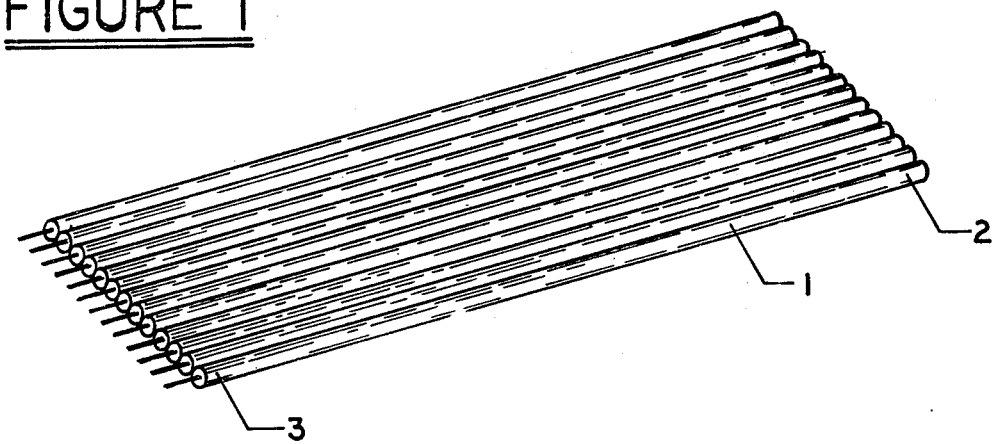
FIG. 1 is a perspective view of a ribbon cable showing conjoined conductive units encased in an insulative sheath, one end of which has been removed for illustrative purposes only to show the electrically conductive wire.

Referring now to FIG. 1 there is illustrated a ribbon cable 1 comprising a plurality of parallel and adjacent conductor units conjoined by means of the electrically insulating sheath or covering provided for each wire. In order to illustrate the nature of the cable one end shown generally as 3 is shown with a small portion of the insulation removed. The other end shown generally at 2 illustrates unstripped conductor units.

Figure 2:
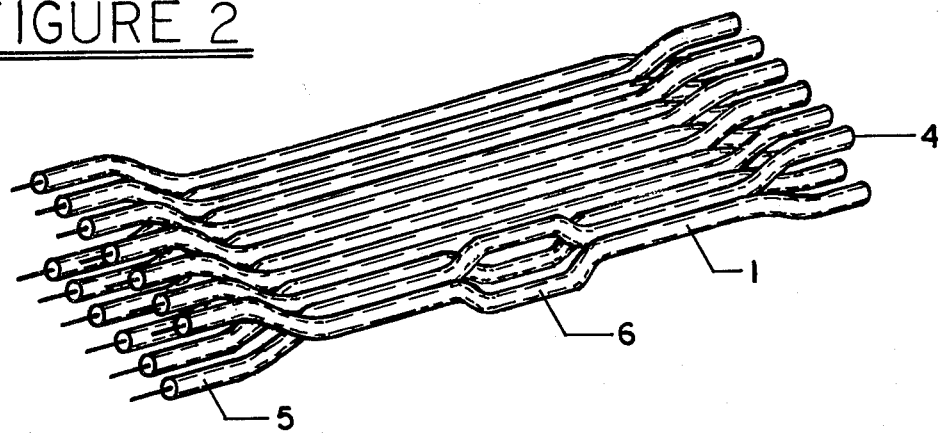
FIG. 2 is a perspective view of a ribbon cable with ends separated and spaced.

FIG. 2 shows an analogous piece of cable after separation and spacing by means of the apparatus of the invention. The web between conductor units has been cut, the units separated and spaced apart vertically. Spacing of unstripped ends are shown generally at 4, stripped ends at 5, and separation and spacing of an intermediate section is shown generally at 6.

In the practice of the invention it is sometimes necessary to separate and space the ends, either stripped or unstripped, for connection to terminal connectors or circuit boards. It is also necessary to separate and space intermediate points prior to cutting and connection to other circuit elements.

Figure 3:
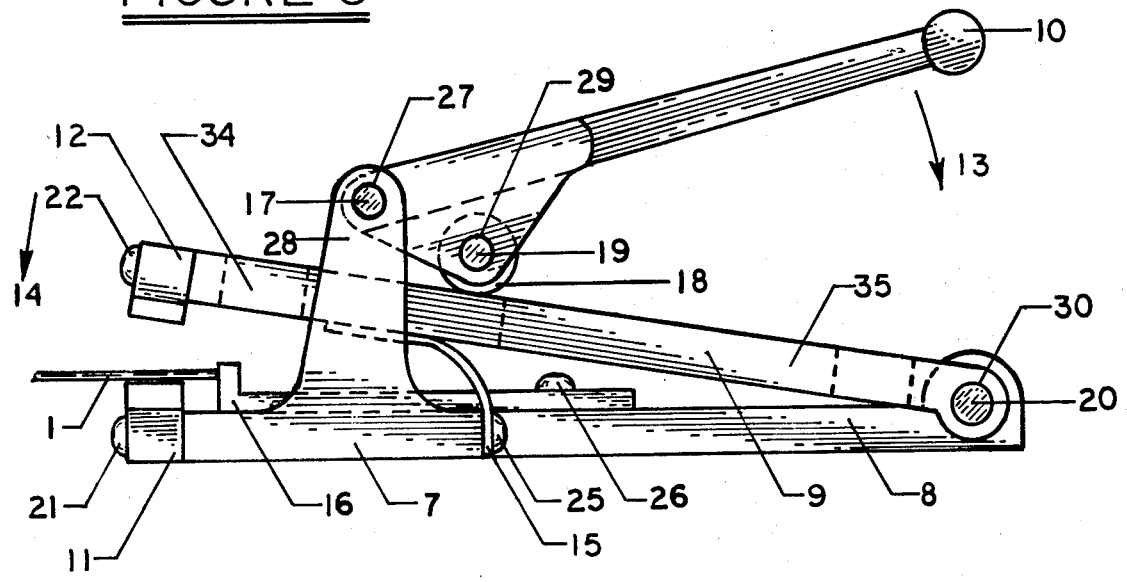
FIG. 3 is a side elevation view of an embodiment of the separating spacing device.
Figure 4:
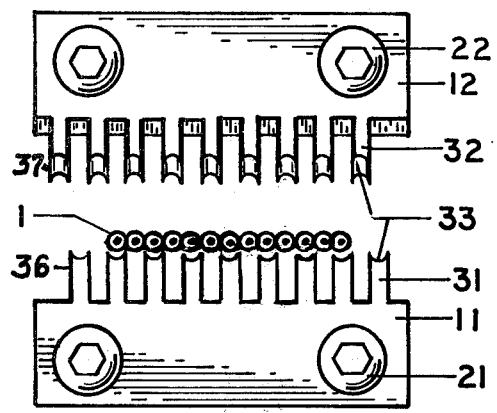
FIG. 4 is a front elevation view of the separating and spacing element of the invention.
Figure 5:
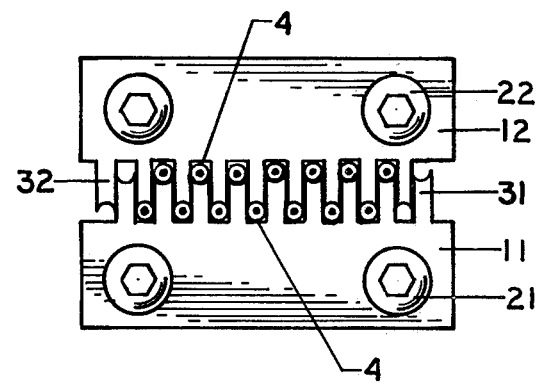
FIG. 5 is a front elevation view of the elements in engagement.

Operation of the apparatus can be seen by reference to FIGS. 3, 4, and 5. FIG. 3 shows a manually operated apparatus of the invention shown generally as 7.

The device comprises a pair of moveable separating and spacing elements, 11 and 12, means for supporting element 11 and means for moving element 12 into operative contact with element 11. The configuration of elements 11 and 12 can be more easily seen by reference to FIGS. 4 and 5. Again referring to FIG. 3, there is shown a device in which element 11 is removeably attached to base 8 by means of screw 21 at the forward end of the base. Also attached to the base 8 but at the opposite end thereof and in pivotal connection is element arm 9. The pivotal connection is made by means of a shaft or pin 20 passing through receiving holes 30 in both the base 8 and the arm 9. This permits reciprocal motion of arm 9 towards base 8.

Extending upwardly from base 8 is a projection 28 provided with a yoke and holes 27. The yoke is adapted to receive the forward end of lever 10 and to be secured thereto by hinge pin 17 so that roller 18 bears upon arm 9 so that depression of lever 10 urges element arm 9 downwardly as roller 18 advances along the upper surface of arm 9. Roller 18 turns on shaft 19 which is mounted through holes 29 provided in lever 10.

Referring now to FIGS. 4 and 5 there is shown upper element 12 and lower element 11, the upper element being vertically moveable and the lower element being fixed with respect to the base 8 of FIG. 3. Both elements are provided with a plurality of spaced meshing teeth illustrated by teeth 31 and 32 on the lower and upper element respectively. The teeth of the upper element 12 are adapted to fit between the teeth of lower element 11 while the upwardly projecting teeth of the lower element fit into the spaces between the teeth of the upper element.

The teeth of each element are provided with a generally channel shaped configuration illustrated at 33 adapted to engage the individual conductor elements without damage, other than moderate compression, while the edges sever the web between adjacent conductor units. Continued convergence of elements 11 and 12 then force alternate conductor units into the spaces between the teeth thereby separating and spacing them as illustrated in FIG. 2.

The length of the teeth determine the length of conductor unit or cable which will be cut, separated and spaced while the width of the teeth, e.g. from face to face, matches the diameter of the individual conductor unit. The height of the teeth which corresponds to the depth of the space between adjacent teeth determines the degree of spacing to be imparted to the conductor units.

In operation for the purpose of separating and spacing the individual conductor units of a ribbon cable assembly, the cable 1 is inserted between the lower element 11 and the upper element 12 resting upon the teeth of the lower element with the end 2 abutting against stop 16. Stop 16 is provided to facilitate placement of the cable. The stop is adjustably secured to base 8 by suitable means such as screw 26 which is accessible via opening 35 in arm 9. The cable is horizontally centered and aligned with the teeth as shown in FIG. 4. To operate the device, the lever 10 is depressed in direction 13 pivoting about hinge pin 17 mounted in holes 27 of projection 28 and lever 10. Roller 18 bears against arm 9 forcing arm 9 downwardly in direction 14 towards lower element 11.

It can be seen that the teeth have side faces illustrated at 36 and 37. The side faces terminate in a pair of upper ends which define, in conjunction with the top of the teeth, a channel shaped surface adapted to engage the conductor units within the channel while providing a shearing action between side faces of alternating upper and lower teeth, e.g. between side 37 of the illustrated upper teeth and side 36 of the illustrated lower tooth. This engagement is illustrated in FIG. 5 where abutting faces 36 and 37 are shown after completion of the downward stroke which has cut the web between adjacent conductor units and spaced the resulting separated units.

Since arm 9 is pivoted about pin 20 there is a slight shearing angle between upper element 12 and lower element 11 when they are in contact. This angle can be more readily visualized by reference to FIG. 3. Continued operation cuts through the connective material between the conductor units by the shearing action of side faces of the teeth illustrated at 36 and 37 of FIGS. 4 and 5, the upper points of which constitute a longitudinal cutting surface.

Figure 6:
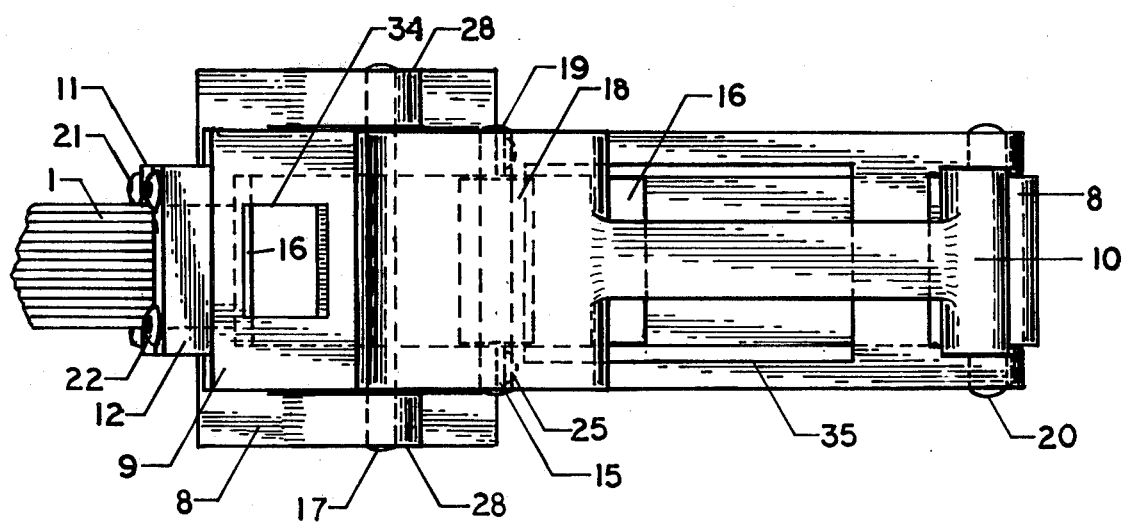
FIG. 6 is a plan view of the device.

In placing the cable assembly in the device the front end of the cable is positioned against stop 16 when the end is to be separated and spaced. In situations where intermediate sections of a cable are to be separated the stop can be removed or repositioned so that the cable can pass through the device via a passageway or opening such as is shown at 34 in FIG. 6.

It will be appreciated that the device of this invention can be adapted for operation in cables of varying width. Similarly, adjustment of the location of the stop can provide accomodation of varying lengths for separation and spacing.

As shown, the device is designed for manual operation. It is apparent however, that various means can be employed to provide power for operation. The teeth-carrying elements can easily be adapted for inclusion in a pneumatic or electric press. Similarly varying arrangements for positioning of the elements can be envisioned within the scope of the invention.

What is claimed:

1. A device for separating and spacing conductive units of a ribbon-type electrical cable consisting of parallel insulated conductor units joined by a web of insulating material, said device comprising a pair of planar opposing engageable jaws each having a plurality of linear meshing teeth having longitudinal channel shaped cutting edges, said teeth being spaced to intermesh whereby said cutting edges shear the web between conductors without removal of insulating material from the conductors, the cutting and separating motion being substantially perpendicular to the length of the cable being cut, and one of said jaws being stationary and the other being movable to affect engagement and intermeshing of the teeth.

2. A device according to claim 1 wherein the jaws are provided with operative means for directing at least one of said jaws towards the other for engagement and means for disengagement of said jaws.

* * * * *